United States Patent
Luo et al.

(10) Patent No.: US 12,038,534 B2
(45) Date of Patent: Jul. 16, 2024

(54) MOTOR FOR ON-VEHICLE LIDAR, ON-VEHICLE LIDAR, AND VEHICLE

(71) Applicant: INNOVUSION (SUZHOU) CO., LTD., Suzhou (CN)

(72) Inventors: Siwei Luo, Suzhou (CN); Jie Han, Suzhou (CN)

(73) Assignee: INNOVUSION (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 18/273,757

(22) PCT Filed: Nov. 23, 2022

(86) PCT No.: PCT/IB2022/061316
§ 371 (c)(1),
(2) Date: Jul. 21, 2023

(87) PCT Pub. No.: WO2023/095006
PCT Pub. Date: Jun. 1, 2023

(65) Prior Publication Data
US 2024/0045029 A1 Feb. 8, 2024

(30) Foreign Application Priority Data
Nov. 24, 2021 (CN) .......................... 202122890626.2

(51) Int. Cl.
*G01S 7/481* (2006.01)
(52) U.S. Cl.
CPC .......... *G01S 7/4813* (2013.01); *G01S 7/4817* (2013.01)
(58) Field of Classification Search
CPC ..................... G01S 7/4813; G01S 7/4817
See application file for complete search history.

(56) References Cited

U.S. PATENT DOCUMENTS

| 3,897,150 A | 7/1975 | Bridges et al. |
| 4,464,048 A | 8/1984 | Farlow |

(Continued)

FOREIGN PATENT DOCUMENTS

| CN | 1677050 A | 10/2005 |
| CN | 204758260 U | 11/2015 |

(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — Thanh Luu
*Assistant Examiner* — Mai Thi Ngoc Tran
(74) *Attorney, Agent, or Firm* — MASCHOFF BRENNAN; Ran Pang; Liang Huang

(57) ABSTRACT

The present disclosure discloses a motor for an on-vehicle LiDAR, the vehicle-borne LiDAR, and a vehicle. The motor comprises a rotor assembly, a flat rubber washer and an optical reflecting mirror, wherein the rotor assembly comprises a housing and a fastening ring, wherein an inner cylinder of the housing is provided with a welding portion at the periphery, and an air slot is provided between the welding portion and the inner cylinder of the housing; and the welding portion is fixed to the fastening ring by means of laser welding. Laser welding is used to fix the fastening ring to the housing of the motor.

9 Claims, 1 Drawing Sheet

(56) References Cited

U.S. PATENT DOCUMENTS

| | | |
|---|---|---|
| 5,006,721 A | 4/1991 | Cameron et al. |
| 5,157,451 A | 10/1992 | Taboada et al. |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | DeAngelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 5,977,498 A * | 11/1999 | Levine ............... H01H 9/04 200/11 R |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di Teodoro et al. |
| 7,489,865 B2 | 2/2009 | Varshneya et al. |
| 7,576,837 B2 | 8/2009 | Liu et al. |
| 7,830,527 B2 | 11/2010 | Chen |
| 7,835,068 B1 | 11/2010 | Brooks et al. |
| 7,847,235 B2 | 12/2010 | Krupkin et al. |
| 7,880,865 B2 | 2/2011 | Tanaka et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu et al. |
| 8,812,149 B2 | 8/2014 | Doak |
| 8,984,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk et al. |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | van Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,148,023 B1 * | 12/2018 | Ju ..................... H01R 12/57 |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,175,405 B2 | 11/2021 | Pacala et al. |
| 11,178,381 B2 | 11/2021 | Pacala et al. |
| 11,190,750 B2 | 11/2021 | Pacala et al. |
| 11,194,048 B1 | 12/2021 | Burbank et al. |
| 11,287,515 B2 | 3/2022 | Pacala et al. |
| 11,422,236 B2 | 8/2022 | Pacala et al. |
| 2002/0136251 A1 | 9/2002 | Green et al. |
| 2003/0107276 A1 * | 6/2003 | Chen ..................... H02K 7/061 310/81 |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di Teodoro et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu et al. |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Borchers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |

(56) References Cited

U.S. PATENT DOCUMENTS

| | | |
|---|---|---|
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bösch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | McCloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Watnik |
| 2016/0291134 A1 | 10/2016 | Droz et al. |
| 2016/0313445 A1 | 10/2016 | Bailey et al. |
| 2016/0327846 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0156896 A1 | 6/2018 | O'Keeffe |
| 2018/0158471 A1 | 6/2018 | Vaughn et al. |
| 2018/0164439 A1 | 6/2018 | Droz et al. |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120951 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |
| 2021/0194315 A1 | 6/2021 | Fukui |

FOREIGN PATENT DOCUMENTS

| | | |
|---|---|---|
| CN | 204885804 U | 12/2015 |
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 114 142 699 A | 3/2022 |
| CN | 215932142 U | 3/2022 |
| CN | 112578396 B | 4/2022 |
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2 000 411 A | 1/1979 |
| JP | 2007144667 A | 6/2007 |
| JP | 2010035385 A | 2/2010 |
| JP | 2017003347 A | 1/2017 |
| JP | 2017138301 A | 8/2017 |
| JP | 2019033120 A * | 2/2019 |
| KR | 10-2012-0013515 A | 2/2012 |
| KR | 10-2013-0068224 A | 6/2013 |
| KR | 10-2018-0107673 A | 10/2018 |
| WO | 2017/110417 A1 | 6/2017 |
| WO | 2018/125725 A1 | 7/2018 |
| WO | 2018/129408 A1 | 7/2018 |
| WO | 2018/129409 A1 | 7/2018 |
| WO | 2018/129410 A1 | 7/2018 |
| WO | 2018/175990 A1 | 9/2018 |
| WO | 2018/182812 A2 | 10/2018 |
| WO | 2019/079642 A1 | 4/2019 |
| WO | 2019/165095 A1 | 8/2019 |
| WO | 2019/165289 A1 | 8/2019 |

(56) References Cited

FOREIGN PATENT DOCUMENTS

| WO | 2019/165294 A1 | 8/2019 |
|---|---|---|
| WO | 2020/013890 A2 | 1/2020 |

OTHER PUBLICATIONS

European Search Report, dated Jul. 17, 2020, for EP Application No. 18776977.3, 12 pages.

European Search Report, dated Jun. 17, 2021, for EP Application No. 18868896.4, 7 pages.

Extended European Search Report, dated Jul. 10, 2020, for EP Application No. 18736738.8, 9 pages.

Extended European Search Report, dated Jul. 22, 2020, for EP Application No. 18736685.1, 10 pages.

Fiber laser, Wikipedia, https://en.wikipedia.org/wiki/Fiber_laser, 6 pages.

Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.

Gunzung, Kim, et al. (Mar. 2, 2016). "A hybrid 3D LIDAR imager based on pixel-by-pixel scanning and DS-OCDMA," p. Proceedings of Spie [Proceedings of SPIE ISSN 0277-786X vol. 10524], SPIE, US, vol. 9751, pp. 975119-975119-8.

International Preliminary Report on Patentability, dated Apr. 30, 2020, for International Application No. PCT/US2018/056577, 8 pages.

International Preliminary Report on Patentability, dated Jul. 9, 2019, for International Application No. PCT/US2018/012703, 10 pages.

International Preliminary Report on Patentability, dated Jul. 9, 2019, for International Application No. PCT/US2018/012704, 7 pages.

International Preliminary Report on Patentability, dated Jul. 9, 2019, for International Application No. PCT/US2018/012705, 7 pages.

International Search Report and Written Opinion, dated Jan. 17, 2020, for International Application No. PCT/US2019/019276, 14 pages.

International Search Report and Written Opinion, dated Jan. 3, 2019, for International Application No. PCT/US2018/056577, 15 pages.

International Search Report and Written Opinion, dated Jul. 9, 2019, for International Application No. PCT/US2019/018987, 17 pages.

International Search Report and Written Opinion, dated Jun. 7, 2018, for International Application No. PCT/US2018/024185, 9 pages.

International Search Report and Written Opinion, dated Mar. 19, 2018, for International Application No. PCT/US2018/012705, 12 pages.

International Search Report and Written Opinion, dated Mar. 20, 2018, for International Application No. PCT/US2018/012703, 13 pages.

International Search Report and Written Opinion, dated Mar. 23, 2018, for International Application No. PCT/US2018/012704, 12 pages.

International Search Report and Written Opinion, dated May 3, 2019, for International Application No. PCT/US2019/019272, 16 pages.

International Search Report and Written Opinion, dated May 6, 2019, for International Application No. PCT/US2019/019264, 15 pages.

International Search Report and Written Opinion, dated Sep. 18, 2018, for International Application No. PCT/US2018/012116, 12 pages.

Mirrors, Physics Libre Texts, https://phys.libretexts.org/Bookshelves/Optics/Supplemental_Modules_(Components)/Mirrors, (2021), 2 pages.

Office Action Issued in Japanese Patent Application No. 2019-536019 dated Nov. 30, 2021, 6 pages.

"Why Wavelengths Matter in Fiber Optics", FirstLight, https://www.firstlight.net/why-wavelengths-matter-in-fiber-optics/, (2021), 5 pages.

International Search Report and Written Opinion issued in PCT/IB2022/061316 dated Feb. 24, 2023, 10 pages.

Communication pursuant to Article 94(3) EPC from EP App. No. 22817383.7 dated Sep. 22, 2023, 5 pages.

\* cited by examiner

MOTOR FOR ON-VEHICLE LIDAR, ON-VEHICLE LIDAR, AND VEHICLE

CROSS REFERENCE TO RELATED APPLICATIONS

This application is a U.S. National Phase application under 35 U.S.C. § 371 of International Application No. PCT/IB2022/061316, filed on Nov. 23, 2022, which claims priority to Chinese Patent Application No. 202122890626.2, filed Nov. 24, 2021, entitled "A VEHICLE-MOUNTED LIDAR MOTOR, VEHICLE-MOUNTED LIDAR AND VEHICLE." The contents of both applications are incorporated by reference in their entireties for all purposes.

TECHNICAL FIELD

The present disclosure relates to the technical field of motors for an autonomous on-vehicle LiDAR, and in particular to a motor for an on-vehicle LiDAR as well as an autonomous vehicle having the LiDAR motor.

BACKGROUND ART

With the rapid development of autonomous driving technology, on-vehicle LiDARs have received more and more attention, and their application has shown an explosive growth trend. At present, an optical reflecting mirror of the on-vehicle LiDAR is usually driven to rotate by an outer rotor motor. In other words, the optical reflecting mirror rotates synchronously with the outer rotor of the motor. In this configuration, the fixing of the optical reflecting mirror to the outer rotor of the motor is important. Since the optical reflecting mirror is brittle, the outer rotor of the motor that is made of stainless steel cannot be in direct contact with the optical reflecting mirror. It is a common practice to firstly provide a flat rubber washer between a fastening ring and the optical reflecting mirror and then fix the optical reflecting mirror to a housing via the fastening ring, so that the optical reflecting mirror will not be damaged.

The fixing of the fastening ring to the housing is usually achieved by means of bolt locking and interference-fit pressing.

With regard to the bolt locking, in an on-vehicle LiDAR, the stability of the rotating optical reflecting mirror is directly related to the laser imaging effect and thus affects the reliability of autonomous driving. The rotor imbalance of the motor will also cause the problem of large vibration noise of the motor. Therefore, in order to ensure the stability of the optical reflecting mirror and reduce the vibration noise of the whole motor, it is necessary to maintain the dynamic balance of the entire rotor assembly. Due to the special characteristics of the product, the initial amount of imbalance of the rotor assembly itself is large, and it is necessary to have enough de-weighting weight on the rotor assembly to meet the needs of the product. This limits the application of bolt locking, because the position with bolt locking cannot be used as an effective position for de-weighting, resulting in insufficient de-weighting. In this way, it is difficult to meet the requirement for enough low imbalance and has low cycle efficiency.

With regard to the interference-fit pressing, the flat rubber washer is used for pre-tightening between the fastening ring and the optical reflecting mirror. It is necessary to detect a pressure-displacement curve to determine whether the flat rubber washer is compressed to a calculated compression rate. If the fastening ring is pressed into the housing in an interference-fit manner, the pre-tightening force of the flat rubber washer cannot be measured, failing to meet the product requirements.

SUMMARY

In view of the technical problems mentioned above, the objective of the present disclosure is to provide a motor for an on-vehicle LiDAR, an on-vehicle LiDAR and a vehicle, for solving the problems of both the bolt locking and the interference-fit pressing for use in an existing commonly used on-vehicle LiDAR motor.

The technical solution of the present disclosure is as follows.

One objective of the present disclosure is to provide a motor for an on-vehicle LiDAR, the motor comprising a rotor assembly, a flat rubber washer and an optical reflecting mirror. The rotor assembly comprises a housing and a fastening ring, with an inner cylinder of the housing being provided with a welding portion at the periphery, and an air slot being provided between the welding portion and the inner cylinder of the housing.

The welding portion is fixed to the fastening ring by means of laser welding.

Optionally, the air slot extends in an axial direction of the housing.

Optionally, the axial length of the air slot is less than that of the inner cylinder of the housing.

Optionally, the welding portion is provided with a chamfer at each welding position to the fastening ring.

Optionally, the welding portion is of an annular structure coaxial with the inner cylinder of the housing.

Optionally, the radial dimension of the welding portion is greater than that of the air slot.

Another objective of the present disclosure is to provide an on-vehicle LiDAR, comprising an optical reflecting mirror and a motor for driving the optical reflecting mirror to rotate, the motor being any one motor for an on-vehicle LiDAR described above.

A further objective of the present disclosure is to provide a vehicle, which is an autonomous vehicle, comprising any one on-vehicle LiDAR described above.

Compared with the prior art, the present disclosure has the following advantages.

According to the motor for an on-vehicle LiDAR of the present disclosure, laser welding is used to fix the fastening ring to the housing of the motor. Laser welding has no mechanical acting force on the product, so that the metal housing, the fastening ring and the mirror surface of the optical reflecting mirror will not be deformed or damaged. Meanwhile, laser welding is also highly efficient and is suitable for industrial application. The fixing by means of laser welding can keep the effective de-weighting weight of dynamic balance on the rotor assembly to the maximum extent, and can meet the requirement of compression ratio measurement of the flat rubber washer. The air slot is additionally provided, not only for reducing the weight appropriately, but also for heat insulation with air to prevent the product failure caused by the deformation of the inner cylinder during laser welding.

BRIEF DESCRIPTION OF THE DRAWINGS

The present disclosure will be further described below in conjunction with the accompanying drawings and the embodiments.

In the figures: 1. housing; 11. welding portion; 111. first chamfer; 2. fastening ring; 21. inner cylinder of the fastening ring; 211. second chamfer; 3. optical reflecting mirror; 4. flat rubber washer; 5. air slot; 6. magnetic ring; A. first end; B. second end; and a. welding position.

DETAILED DESCRIPTION OF EMBODIMENTS

In order to illustrate the objectives, technical solutions and advantages of the present disclosure more clearly, the present disclosure will be further described in detail below in conjunction with the detailed description of embodiments and with reference to the accompanying drawings. It should be understood that these descriptions are exemplary only, rather than limiting the scope of the present disclosure. Moreover, in the following illustration, the description of the commonly known structures and techniques are omitted to avoid unnecessary confusion of the concept of the present disclosure.

Figure 1:
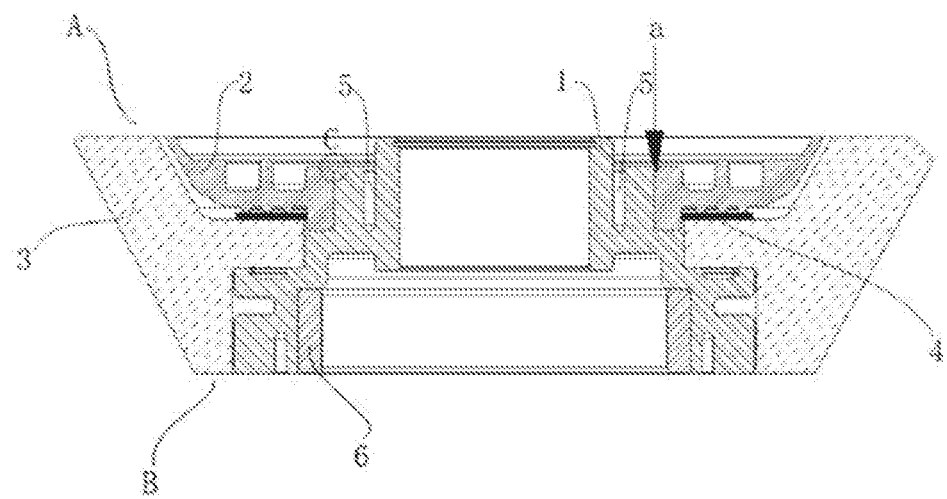
FIG. 1 is a schematic cross-sectional structural diagram of a motor for an on-vehicle LiDAR according to an embodiment of the present disclosure.

Referring to FIG. 1, a motor for an on-vehicle LiDAR of this embodiment comprises a rotor assembly, a flat rubber washer 4 and an optical reflecting mirror 3, the rotor assembly comprising a housing 1 and a fastening ring 2. An inner cylinder of the housing 1 is provided with a welding portion 11 at the periphery, and an air slot 5 is provided between the welding portion 11 and the inner cylinder of the housing 1. The welding portion 11 is fixed to the fastening ring 2 by means of laser welding.

According to the motor for an on-vehicle LiDAR of this embodiment, laser welding is used to fix the fastening ring 2 to the housing 1. Laser welding has no mechanical acting force on the product, so that the metal housing 1, the fastening ring 2 and the mirror surface of the optical reflecting mirror 3 will not be deformed or damaged; and laser welding also has high efficiency and is suitable for industrial application. The method of fixing by means of laser welding can keep the effective de-weighting weight of dynamic balance on the rotor assembly to the maximum extent, and can meet the requirement of compression ratio measurement of the flat rubber washer 4. The air slot 5 is additionally provided, not only for reducing the weight appropriately, but also for heat insulation with air to prevent the product failure caused by the deformation of the inner cylinder during laser welding.

Specifically, the air slot 5 extends in an axial direction of the housing 1, i.e., a vertical direction as shown in FIG. 1. For ease of description, the upper end of the housing 1, the fastening ring 2 and the optical reflecting mirror 3 as shown in FIG. 1 is referred to as a first end A, and the lower end of the housing 1, the fastening ring 2 and the optical reflecting mirror 3 is referred to as a second end B. The welding portion 11 is provided on the periphery of the inner cylinder at the first end A of the housing 1 and is of an annular structure coaxial with the inner cylinder of the housing 1. A gap or the air slot 5 is formed between an inner wall of the welding portion 11 and an outer wall of the inner cylinder at the first end A of the housing 1. The air slot penetrates the first end A of the welding portion 11 and extends towards the second end B but does not penetrate the second end B. That is to say, the axial length of the air slot 5 is less than that of the inner cylinder of the housing 1, so that the welding portion 11 and the housing 1 are of an integral structure, facilitating the welding and fixing between the housing 1 and the fastening ring 2.

In a preferred embodiment, the radial dimension of the welding portion 11 is greater than that of the air slot 5. That is, as shown in FIG. 1, the left-right width of the welding portion 11 is greater than that of the air slot 5.

Figure 2:
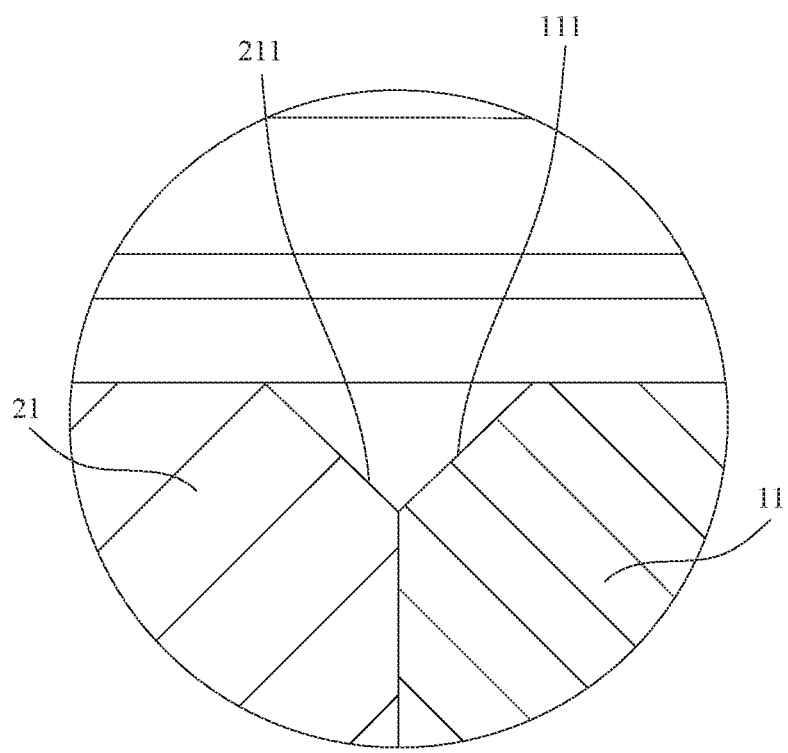
FIG. 2 is an enlarged view of part C in FIG. 1.

As shown in FIGS. 1 and 2, in order to facilitate the welding and fixing of the fastening ring 2 and the welding portion 11, an oblique surface extending obliquely downward to the right is provided, that is, chamfering is performed, at the welding position of the welding portion 11, i.e., the periphery of the first end A as shown in FIG. 1. For ease of description, this oblique surface is referred to as a first chamfer 111. Correspondingly, an oblique surface extending obliquely downward to the right is also provided, that is, chamfering is performed, at the welding position of the fastening ring 2, i.e., the first end A of an inner peripheral wall of the inner cylinder of the fastening ring 2 as shown in FIG. 1. For ease of description and distinction, the oblique surface here is referred to as a second chamfer 211. The two chamfers are joined into a V-shaped welding portion 11 before welding, so that welding can be conveniently performed.

It should be noted that the motor further comprises a rotating shaft, a magnetic ring 6, a wound stator and other structures, the magnetic ring 6 and the wound stator being arranged on an inner side of the second end B of the housing 1. These structures are conventional and are not described and defined in detail herein.

The process steps of the motor for an on-vehicle LiDAR of the present disclosure include: the housing 1, the magnetic ring 6, the optical reflecting mirror 3, the flat rubber washer 4 and the fastening ring 2 are assembled together, the fastening ring 2 is pressed tightly using a servo pressing machine, and then laser circumferential welding and segmented welding are performed at the welding position of the welding portion 11 and the welding position of the fastening ring 2, so that the process of the product is finally completed.

The embodiment of the present disclosure further provides an on-vehicle LiDAR, comprising an optical reflecting mirror 3 and a motor for driving the optical reflecting mirror 3 to rotate, the motor being the motor for an on-vehicle LiDAR of the embodiment described above. With the motor for an on-vehicle LiDAR of the embodiment described above, the LiDAR at least has the beneficial effects of the motor for an on-vehicle LiDAR of the embodiment described above. Similarly, there is no mechanical acting force on the product, so that the metal housing 1, the fastening ring 2 and the mirror surface of the optical reflecting mirror 3 will not be deformed or damaged; and laser welding is also highly efficient and is suitable for industrial application. The fixing by means of laser welding can keep the effective de-weighting weight of dynamic balance on the rotor assembly to the maximum extent, and can meet the requirement of compression ratio measurement of the flat rubber washer 4. The air slot 5 is additionally provided, not only for reducing the weight appropriately, but also for heat insulation with air to prevent the product failure caused by the deformation of the inner cylinder during laser welding.

The embodiment of the present disclosure further provides a vehicle, which is an autonomous vehicle, comprising the on-vehicle LiDAR of the embodiment described above. With the on-vehicle LiDAR of the embodiment described above, the vehicle has at least the beneficial effects of the on-vehicle LiDAR of the embodiment described above.

Similarly, there is no mechanical acting force on the product, and the metal housing 1, the fastening ring 2 and the mirror surface of the optical reflecting mirror 3 are not deformed or damaged; and laser welding is also highly efficient and is suitable for industrial application. The fixing by means of laser welding can keep the effective de-weighting weight of dynamic balance on the rotor assembly to the maximum extent, and can meet the requirement of measurement of compression ratio of the flat rubber washer 4. The air slot 5 is additionally provided, not only for reducing the weight appropriately, but also for heat insulation with air to prevent the product failure caused by the deformation of the inner cylinder during laser welding.

It should be understood that the detailed description of embodiments of the present disclosure are merely used for illustration or explanation of the principle of the present disclosure and are not construed as limiting the present disclosure. Therefore, any modifications, equivalent substitutions, improvements, etc. made within the spirit and scope of the present disclosure should be included within the scope of protection of the present disclosure. In addition, the appended claims of the present disclosure are intended to cover all the variations and modifications that fall within the scope and boundary of the appended claims thereof or equivalents of the scope and boundary.

What is claimed is:

1. A motor for an on-vehicle Light Detection and Ranging (LiDAR) system, comprising a rotor assembly, a flat rubber washer and an optical reflecting mirror, the rotor assembly comprising a housing and a fastening ring,
    wherein an inner cylinder of the housing is provided with a welding portion at a periphery, and an air slot is provided between the welding portion and the inner cylinder of the housing; and
    the welding portion is fixed to the fastening ring by means of laser welding.

2. The motor for an on-vehicle LiDAR according to claim 1, wherein the air slot extends in an axial direction of the housing.

3. The motor for an on-vehicle LiDAR according to claim 2, wherein an axial length of the air slot is less than that of the inner cylinder of the housing.

4. The motor for an on-vehicle LiDAR according to claim 1, wherein the welding portion is provided with a chamfer at each welding position to the fastening ring.

5. The motor for an on-vehicle LiDAR according to claim 1, wherein the welding portion is of an annular structure coaxial with the inner cylinder of the housing.

6. The motor for an on-vehicle LiDAR according to claim 5, wherein a radial dimension of the welding portion is greater than that of the air slot.

7. An on-vehicle Light Detection and Ranging (LiDAR) system, comprising:
    an optical reflecting mirror; and
    a motor for driving the optical reflecting mirror to rotate, the motor being a motor for the on-vehicle LiDAR system, comprising:
        a rotor assembly;
        a flat rubber washer; and
        the rotor assembly comprising a housing and a fastening ring,
        wherein an inner cylinder of the housing is provided with a welding portion at a periphery, and an air slot is provided between the welding portion and the inner cylinder of the housing; and
        the welding portion is fixed to the fastening ring by means of laser welding.

8. A vehicle, comprising an on-vehicle Light Detection and Ranging (LiDAR) system, the on-vehicle LiDAR system comprising:
    an optical reflecting mirror; and
    a motor for driving the optical reflecting mirror to rotate, the motor being a motor for an on-vehicle LiDAR, comprising:
        a rotor assembly;
        a flat rubber washer; and
        the rotor assembly comprising a housing and a fastening ring,
        wherein an inner cylinder of the housing is provided with a welding portion at a periphery, and an air slot is provided between the welding portion and the inner cylinder of the housing; and
        the welding portion is fixed to the fastening ring by means of laser welding.

9. The motor for an on-vehicle LiDAR system according to claim 1, wherein the flat rubber washer is between the fastening ring and the optical reflecting mirror.

* * * * *